(12) United States Patent
Dunn

(10) Patent No.: US 6,884,001 B1
(45) Date of Patent: Apr. 26, 2005

(54) FARM POND SEDIMENT DIVERTER

(76) Inventor: Robert J. Dunn, 11016 Lippitt Ave., Dallas, TX (US) 75218

( * ) Notice: Subject to any disclaimer, the term of this patent is extended or adjusted under 35 U.S.C. 154(b) by 53 days.

(21) Appl. No.: 10/360,317

(22) Filed: Feb. 7, 2003

(51) Int. Cl.[7] .............................. E02B 7/26; C02F 1/00
(52) U.S. Cl. ........................................ 405/92; 210/745
(58) Field of Search ....................... 137/119.01, 119.1, 137/872, 875; 210/96.1, 740, 745, 747, 170; 405/87, 92, 93, 96, 103–106

(56) References Cited

U.S. PATENT DOCUMENTS

| | | | |
|---|---|---|---|
| 729,962 A | | 6/1903 | Rastall |
| 2,680,351 A | * | 6/1954 | Jaramillo ...................... 405/92 |
| 5,067,850 A | | 11/1991 | Gray ........................... 405/92 |
| 5,160,036 A | | 11/1992 | Childers ...................... 210/85 |
| 5,360,538 A | * | 11/1994 | Beard ......................... 210/96.1 |
| 5,558,131 A | | 9/1996 | Cohee et al. ................. 138/93 |
| 5,562,819 A | | 10/1996 | Turner, Jr. et al. ............ 210/85 |
| 6,171,507 B1 | * | 1/2001 | Roy et al. .................... 210/739 |
| 6,213,684 B1 | | 4/2001 | Fowler et al. ............... 405/127 |
| 6,245,224 B1 | * | 6/2001 | Enoki et al. .................. 210/87 |

OTHER PUBLICATIONS

PCT Publication WO 01/42147 A1 published Jun. 14, 2001.

* cited by examiner

*Primary Examiner*—Sunil Singh
(74) *Attorney, Agent, or Firm*—Thompson & Gustavson, L.L.P.

(57) ABSTRACT

An apparatus is disclosed for controlling water flow into a reservoir such as a farm pond (100) to prevent silting of the pond due to sediment deposits during heavy rains. A gate assembly (10) has a reservoir gate (12) to let water into the pond when the water is clear and block water flow into the reservoir when the water is sediment laden. The assembly (10) also has a diverter gate (14) which opens to allow the turbid flow to flow around the pond in a diverter channel (104) The gates work in opposite directions so that the water flow is either permitted into the reservoir or diverted around the pond in the diverter channel. A turbidity detector (50) upstream of the gate assembly senses the turbidity of the water to control the gate assembly. The apparatus is preferably powered by a battery recharged by a solar cell. The battery can be buried underground to resist overheating of the battery.

10 Claims, 3 Drawing Sheets

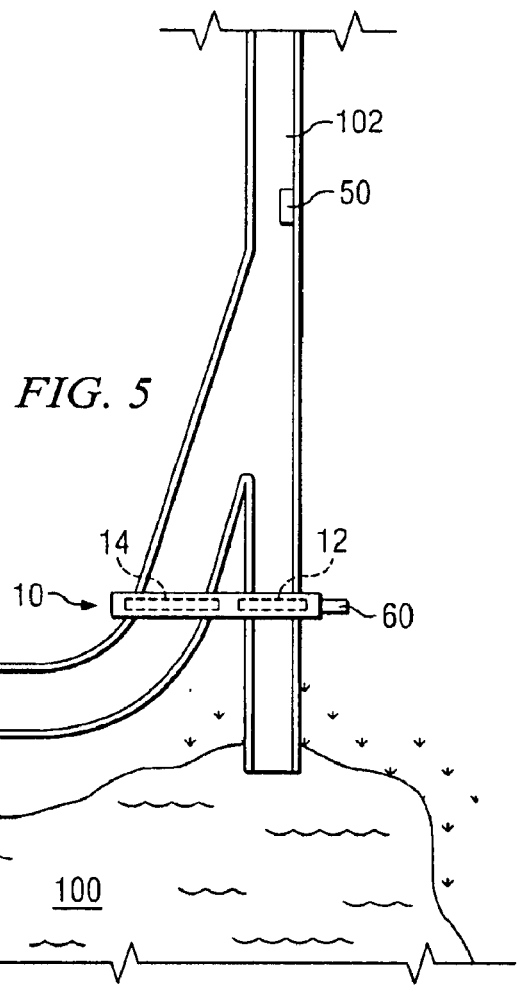
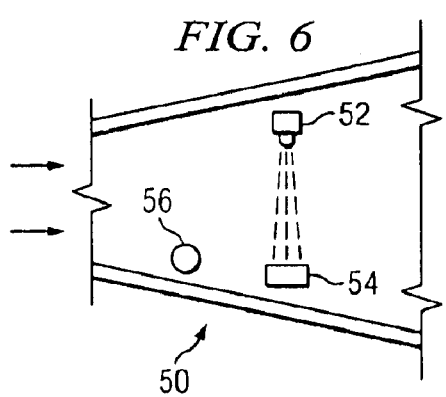
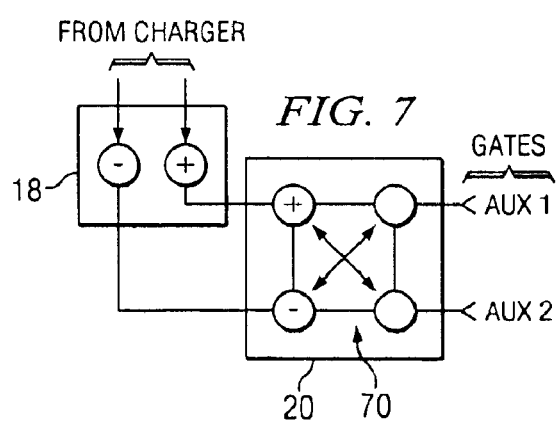

FARM POND SEDIMENT DIVERTER

BACKGROUND OF THE INVENTION

Farm ponds are commonly found in agricultural regions and comprise a bowl or depression in the ground which collects rain water, allowing the water to be stored and used for agricultural purposes. Unfortunately, when heavy rains from a thunderstorm fill the pond, the rain flow into the pond carries a large quantity of silt and sediment into the pond, and the pond often becomes filled with the silt and sediment after a couple of years, requiring the pond to be dredged.

SUMMARY OF THE INVENTION

In accordance with one aspect of the present invention, an apparatus is provided for controlling water flow in a main channel to a reservoir which includes a gate assembly having a reservoir gate moveable between an open position to permit water flow from the main channel into the reservoir and a closed position to prevent water flow from the main channel into the reservoir and a diverter gate moveable between an open position to permit water flow from the main channel into a diverter channel and a closed position to prevent water flow from the main channel into the diverter channel, the reservoir gate and the diverter gate being in opposite positions. A turbidity detector is positioned in the main channel upstream of the gate assembly to detect the quantity of debris in the water flow, the gate assembly moving the reservoir gate to the closed position and the diverter gate to the open position when the turbidity detector detects debris exceeding a predetermined limit.

In accordance with another aspect of the present invention, a method is provided for controlling water flow in a main channel to a reservoir which includes the step of detecting the turbidity of the water flow upstream of a gate assembly with a turbidity detector, the gate assembly having a reservoir gate moveable between an open position to permit water flow from the main channel into the reservoir and a closed position to prevent water flow from the main channel into the reservoir and a diverter gate moveable between an open position to permit water flow from the main channel into a diverter channel and a closed position to prevent water flow from the main channel into the diverter channel, the reservoir gate and the diverter gate being in opposite positions. The method further includes the step of moving the reservoir gate to the closed position and the diverter gate to the open position when the turbidity detector detects debris exceeding a predetermined limit.

BRIEF DESCRIPTION OF THE DRAWINGS

A more complete understanding of the invention and its advantages will be apparent from the following Detailed Description when taken in conjunction with the accompanying Drawings, in which:

FIG. 5 is a plan view of the first embodiment of the present invention installed to control water flow into a farm pond;

FIG. 6 is a view of the turbidity detector;

FIG. 7 is a schematic of electrical features of the gate assembly;

DETAILED DESCRIPTION

Figure 1:
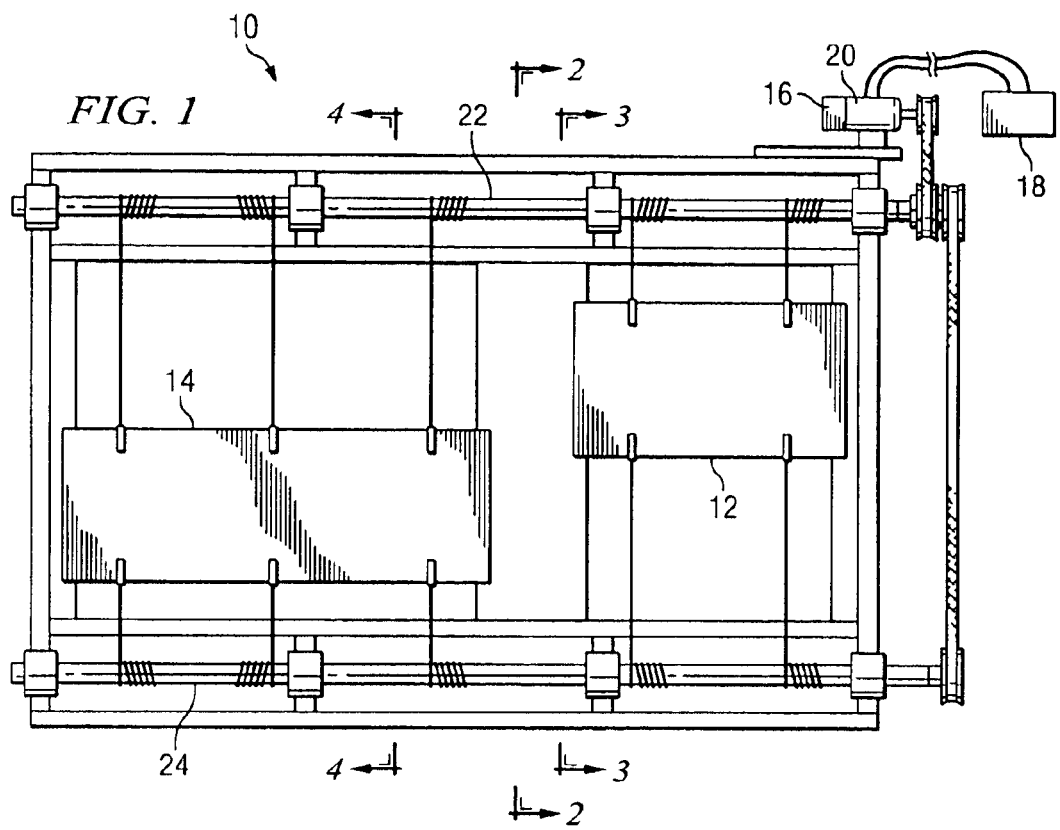
FIG. 1 is a front view of a gate assembly forming a portion of a first embodiment of the present invention.
Figure 2:
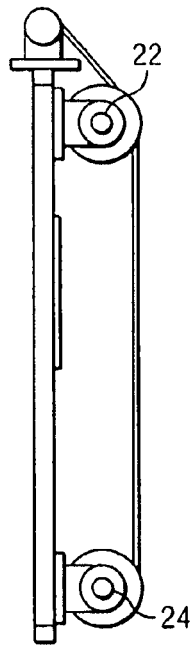
FIG. 2 is a side view of the gate assembly.
Figure 3:
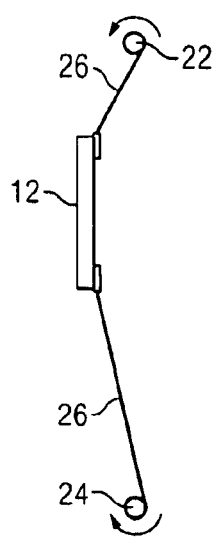
FIG. 3 is a side view illustrating the motion of the pond gate.
Figure 4:
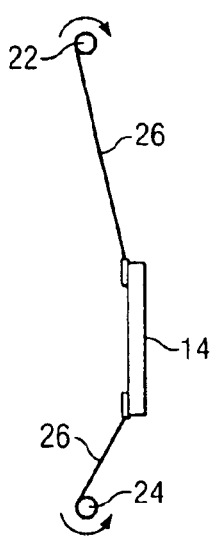
FIG. 4 is a side view illustrating the motion of the diverter gate.

Referring now to the drawings, where like reference characters designate like or corresponding parts throughout the several views, there is illustrated an apparatus forming a first embodiment of the present invention which diverts silt laden water from heavy rain falls flowing in main water channel 102 around a pond 100, while permitting clear, unsilted water from light and moderate rain falls flowing in main water channel 102 to enter the pond 100 to refill the pond 100. As seen in FIGS. 1–6, the apparatus includes a gate assembly 10 which includes a pond gate 12 which is lowered to block water flow from the main water channel 102 from entering the pond 100 to prevent silt laden water from entering the pond 100 and raised to allow clear water to flow into the pond and a diverter gate 14 which is raised to allow silt laden water flowing in the main channel 102 to flow in a diverter channel 104 around the pond 100 during heavy rains and lowered to prevent clear water from flowing in the diverter channel 104. The discharge from the gates 12 and 14 should be taken care of so that water flows downhill from the gates without creating a gully. The pond gate 12 and the diverter gate 14 are always in opposite positions, i.e., when the pond gate 12 is lowered, the diverter gate 14 is raised, and vice versa. The diverter gate 14 should be capable of passing at least twice the water flow as pond gate 12. This is because there is generally a larger flow of water at the start of a thunder storm than there is after it settles down to a slow rain. The framework for the gates can be of galvanized iron 1½ inch by 1½ inch by ⅛ inch. The pond gate 12 and diverter gate 14 can be of galvanized iron also. If the gates 12 and 14 are difficult to open and close, they can be mounted on the framework through linear motion roller bearings.

A turbidity detector 50 is used upstream of the gate assembly 10 to detect the quantity of silt in the water flowing in the main channel 102 which is approaching the gate assembly 10 and pond 100. The detector 50 can comprise an LED 52 as a light source and a light detector 54 that senses the light from the LED 52. The LED 52 and light detector 54 are spaced apart in a channel 102 carrying the water up stream of the pond. FIG. 1 illustrates a channel 120 through which water can flow that has swimming pool style watertight light lenses 122 and 124 on either side of the channel. The light source can shine through light lense 122, with the light passing through the water in the channel received by the light detector 54 through light lense 124.

If the water is clear, with low silt content, the light detector 54 will detect a strong signal from the LED 52 through the water and a control 16 will cause power to flow from a power source 18, preferably a 12 Volt battery, to a motor 20 to rotate upper shaft 22 and lower shaft 24 in the gate assembly 10 in a first direction through various gears and belts. Cables 26 are attached to each side of the gates and wrapped around the shafts 22 and 24 in such a manner that as the motor rotates the shafts in the first direction, the gate 12 will be raised to allow the clear water to flow into the pond 100 and the gate 14 will be lowered to prevent the clear water from flowing around the pond 100 in the diverter channel 104. FIG. 1 illustrates the diverter gate 14 to have a center cable 26, as well as cables 26 at each end of the diverter gate 14. However, the center cable 26 can be eliminated, if desired. The cables should be of stainless steel to prevent rusting. The upper shaft 22 and lower shaft 24 should be steel tubing rotating in bronze bearings lubricated with grease fittings loaded with waterproof grease. The motor 20 can be an automotive electric window motor or tailgate motor. Reduction gears can be mounted between the motor 20 and the upper shaft 22 and lower shaft 24 to increase the effective torque of the motor 20. The reduction gears can be bicycle or motorcycle sprockets and chains with the center cut out of a sprocket and the remainder of the sprocket welded to the drive axle of the motor 20.

Similarly, if the detector 50 senses silted water, with little of the light from the LED 52 able to reach the light detector 54 through the water, the control 16 will cause power to flow in the motor 20 in the reverse direction to rotate shafts 22 and 24 in the direction opposite the first direction. This will cause the gate 12 to be lowered to prevent the silt laden water from entering the pond 100 while the gate 14 is raised to divert the silt laden water around the pond through the diverter channel 104. This will prevent the pond 100 from silting in and eliminate the need to dredge the pond 100 on a periodic basis.

FIG. 7 illustrates the electrical connection from battery 18 to a portion of the control 16 which includes a reversing switch 70 that can switch the polarity of the power to the motor 20 to cause it to rotate in one direction or the other. If Aux 1 is positive, the motor 20 will rotate to raise pond gate 12, while if Aux 2 is positive, the motor 20 will rotate in the opposite direction to lower pond gate 12.

Preferably the battery 18 is buried at least two feet under ground to control the temperature of the battery, particulary on hot summer days. The battery is kept charged by a solar cell 60 on the gate assembly 10 . The diverter gate 14 will usually be larger than the pond gate 12 to handle the large flow rates during a thunder storm or other heavy rain. The shape of the turbidity detector 50 will be such that any weeds and grass entering the detector will flow through the detector, to prevent malfunctions. The turbidity detector 50 will thus remain clean. The gate assembly 10 will be unpowered to conserve energy until a float switch 56 in the turbidity detector is floated up to an on position by the presence of water flowing through the detector. When the pond 100 is large, two or more diverter assemblies can be used.

Figure 8:
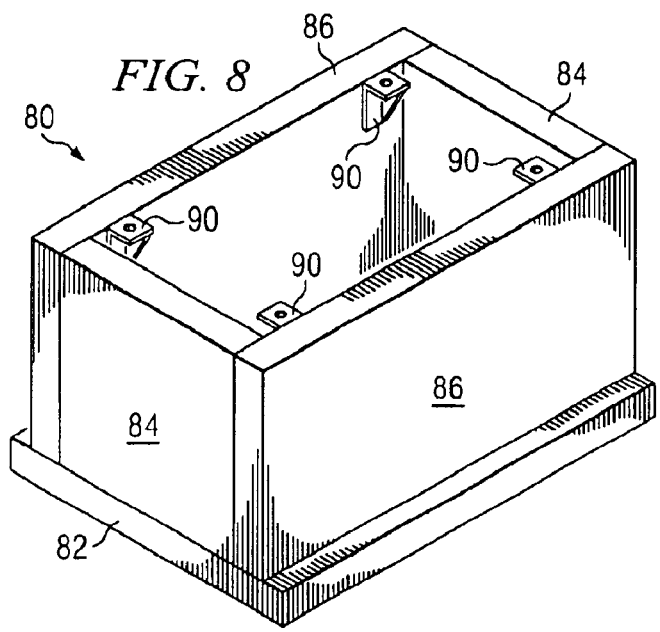
FIG. 8 is a perspective view of a battery box for the gate assembly.
Figure 10:
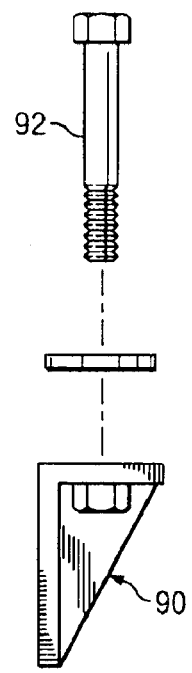
FIG. 10 is a view of a bracket and bolt for use with the battery box.
Figure 9:
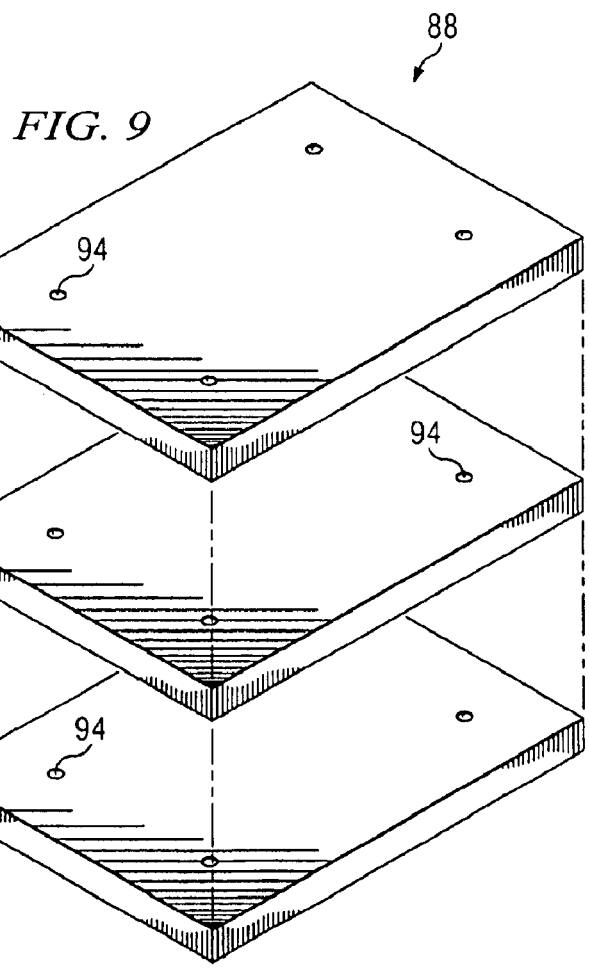
FIG. 9 is a partial perspective view of the lid for the battery box.
Figure 11:
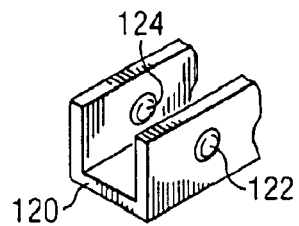
FIG. 11 is a perspective view of a portion of a possible turbidity detector.

FIGS. 8, 9 and 10 illustrate a battery box 80 suitable for holding the battery 18. The battery box 80 is formed of a bottom 82, ends 84, sides 86 and a top 88. The battery box 80 is preferably partially buried in the ground, with the lowest portion of the battery box at least 6 to 8 inches above the highest water level of the pond 100. The bottom 82, ends 84 and sides 86 are secured together by suitable fastening techniques, such as nails, screws, glue or a combination thereof. Preferably, the bottom 82, ends 84 and sides 86 are preferably permanently secured together. The top 88 is secured to the remainder of the battery box 80 by brackets 90 secured on the interior surfaces of the sides 86 and bolts 92. Preferably, the top 88 has 4 holes 94 formed at the ends thereof to receive bolts 92 to secure the top 88 to the remainder of the battery box 80. The battery box 80 should survive cattle stepping on it without damaging the battery box 80. In one embodiment constructed in accordance with the teachings of the present invention. The bottom 82 is formed of 2"×14"×16" pressure treated wood, the ends are formed of 2"×10"×11½" pressure treated wood, the sides are formed of 2"×12"×16" pressure treated wood, and the top 88 is formed of three layers of 2"×14"×16" pressure treated wood with 2 holes of 7/16" diameter at each end to receive the bolts 92. The bolts are 3/8"–16×5" stainless steel bolts with a fender washer. A nut to receive the bolt forms part of the brackets 90.

In a particularly large pond, two or more gate assemblies 10 can be utilized. Preferably, one gate assembly 10, forming a master unit, will provide power to the other gate assemblies, allowing the other gate assemblies to be a little simpler and cheaper to build as they will not require their own power supply.

While a single embodiment of the present invention has been illustrated in the accompanying drawings and described in the foregoing detailed description, it will be understood that the invention is not limited to the embodiment disclosed, but is capable of numerous rearrangements, modifications and substitutions of parts and elements without departing from the scope and spirit of the invention.

What is claimed is:

1. An apparatus for controlling rain water flow in an open main channel to a farm pond, comprising:

a gate assembly having a reservoir gate moveable between an open position to permit water flow from the open main channel into the farm pond and a closed position to prevent water flow from the open main channel into the farm pond and a diverter gate moveable between an open position to permit water flow from the open main channel into a diverter channel not connected to the farm pond and a closed position to prevent water flow from the open main channel into the diverter channel, the reservoir gate and the diverter gate being in opposite positions; and a turbidity detector positioned in the open main channel upstream of the gate assembly to detect the quantity of debris in the water flow, the gate assembly moving the reservoir gate to the closed position and the diverter gate to the open position when the turbidity detector detects debris exceeding a predetermined limit.

2. The apparatus of claim 1 wherein the turbidity detector includes a light detector and a source of light in the water flow.

3. The apparatus of claim 1 wherein the apparatus includes a battery to power the movement of the gates and power the turbidity detector.

4. The apparatus of claim 3 further including a solar cell to recharge the battery.

5. The apparatus of claim 3 wherein the battery is buried underground to control the temperature of the battery.

6. The apparatus of claim 1 wherein the turbidity detector is self cleaning.

7. The apparatus of claim 1 wherein the diverter gate can handle water flow at a least twice the flow rate of the reservoir gate.

8. An apparatus for controlling water flow in a main channel to a reservoir, comprising:

a gate assembly having a reservoir gate moveable between an open position to permit water flow from the main channel into the reservoir and a closed position to prevent water flow from the main channel into the reservoir and a diverter gate moveable between an open position to permit water flow from the main channel into a diverter channel and a closed position to prevent water flow from the main channel into the diverter channel, the reservoir gate and the diverter gate being in opposite positions;

a turbidity detector positioned in the main channel upstream of the gate assembly to detect the quantity of debris in the water flow, the gate assembly moving the reservoir gate to the closed position and the diverter gate to the open position when the turbidity detector detects debris exceeding a predetermined limit; and wherein the gate assembly has a first shaft mounted for rotation and a second shaft mounted for rotation, at least one reservoir gate cable being wrapped about the first and second shafts and attached to the reservoir gate so that rotation of said first and second shafts moves the reservoir gate between the open and closed positions, at least one diverter gate cable being wrapped about the first and second shafts and attached to the diverter gate so that rotation of said first and second shafts moves the diverter gate between the open and closed positions, rotation of the first and second shafts in a first rotational direction moving the reservoir gate to the closed position and the diverter gate to the opened position, and rotation of the first and second shafts in the opposite rotational direction moving the reservoir gate to the opened position and the diverter gate to the closed position.

9. The apparatus of claim 8 further including a motor to rotate the first and second shafts in the first rotational direction and opposite rotational direction.

10. A method for controlling rain water flow in an open main channel to a farm pond, comprising the steps of:

detecting the turbidity of the water flow upstream of a gate assembly with a turbidity detector, the gate assembly having a reservoir gate moveable between an open position to permit water flow from the open main channel into the farm pond and a closed position to prevent water flow from the open main channel into the farm pond and a diverter gate moveable between an open position to permit water flow from the open main channel into a diverter channel not connected to the farm pond and a closed position to prevent water flow from the open main channel into the diverter channel, the reservoir gate and the diverter gate being in opposite positions; and moving the reservoir gate to the closed position and the diverter gate to the open position when the turbidity detector detects debris exceeding a predetermined limit.

* * * * *